P. J. MacDONALD.
REDUCTION APPARATUS.
APPLICATION FILED SEPT. 18, 1916.
1,264,832.
Patented Apr. 30, 1918.
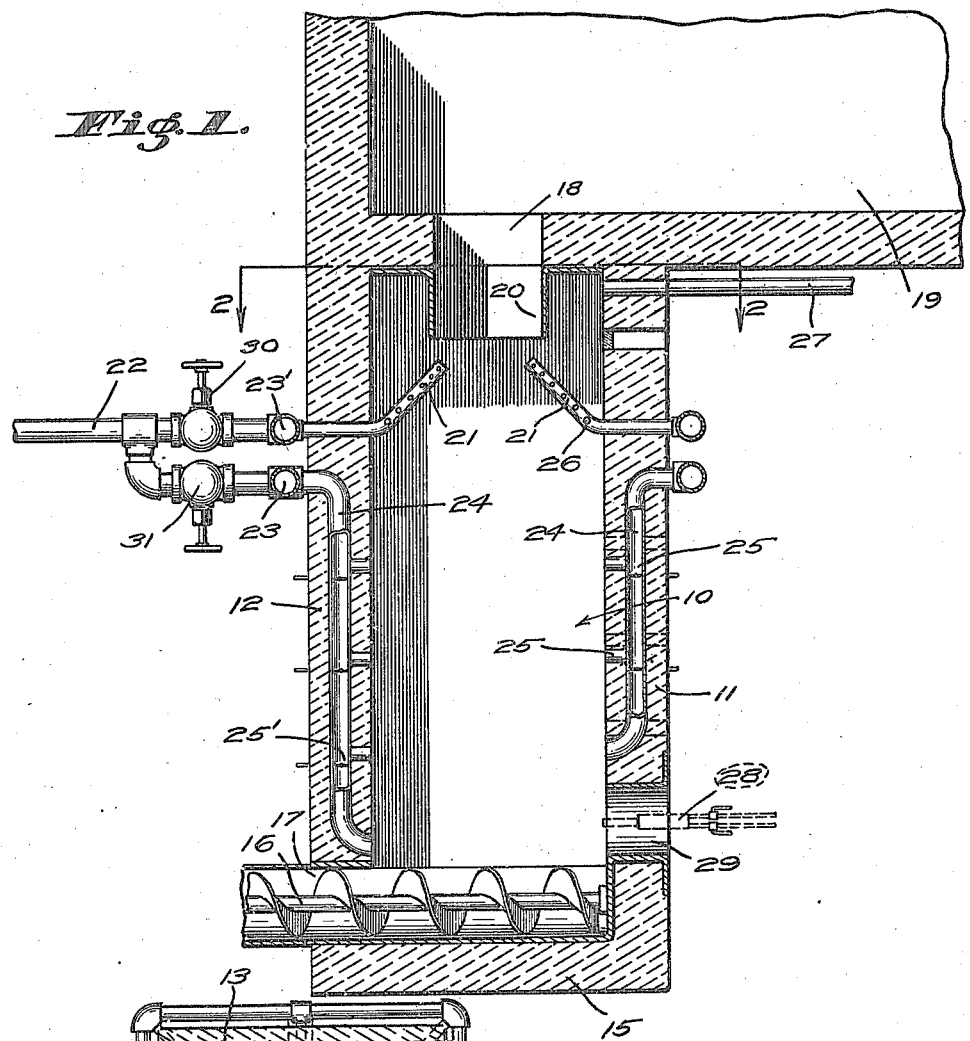
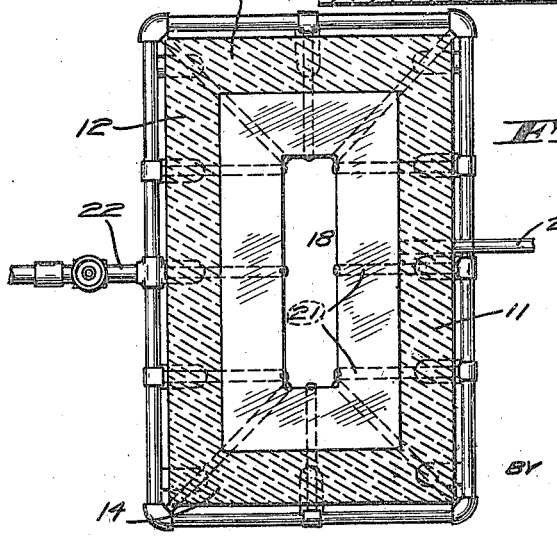
INVENTOR:
FARISH J. MacDONALD
BY Hazard Berry & Miller
ATTORNEYS

UNITED STATES PATENT OFFICE.

PARISH J. MacDONALD, OF LOS ANGELES, CALIFORNIA, ASSIGNOR OF ONE-HALF TO C. L. CLAFLIN, JR., OF BAKERSFIELD, CALIFORNIA.

REDUCTION APPARATUS.

1,264,832.　　　　　　Specification of Letters Patent.　　Patented Apr. 30, 1918.

Application filed September 18, 1916.　Serial No. 120,766.

*To all whom it may concern:*

Be it known that I, PARISH J. MacDONALD, a citizen of the United States, residing at Los Angeles, in the county of Los Angeles and State of California, have invented new and useful Improvements in Reduction Apparatus, of which the following is a specification.

This invention relates to a reducing chamber and a method of applying carbon monoxid and other gases thereto for the direct reduction of the metallic oxids of ores.

It is an object of this invention to provide a reducing chamber for the treatment of ores, which will act continuously in conjunction with a calciner to reduce the metallic oxids by a method which will insure their complete reduction and extraction.

Another object is to provide means whereby the ore may be agitated by reducing agents in a manner to permit the gravitation of the metals and allow them to agglomerate to form nodules which will readily collect the microscopic particles of the metals and thus facilitate their extraction.

Another object is to provide a reduction chamber which will insure that the ore will be agitated by the reducing agents in a manner to prevent gas currents being formed which would pass from the reducing chamber to the calciner and which would carry quantities of metallic dust of high value, thus causing this dust which would otherwise be lost, to agglomerate upon the nodules and be recovered.

Another object is to provide means for causing the reduction to begin when the initial supply of metallic oxids has reached the gas zone and to continue thereafter irrespective of the quantity of ore in the chamber and without danger of the reducing agents becoming pocketed within the ore without producing an agitating action.

Another object is to provide simple means for conveying the nodulated metal and gangue from the reducing chamber in a positive manner and by a mechanism which may be controlled to vary its speed of operation.

It is a further object to provide means within a reducing chamber whereby the chamber may be initially heated to a proper heat for the reception of metallic oxids, without producing oxidation of them and to provide means for insuring that the uppermost and most highly heated ore will be treated by the reducing agents when it reaches the reducing zone.

Other objects will appear hereinafter.

The invention is illustrated, by way of example, in the accompanying drawings in which:

Figure 1 is a view in vertical section and elevation as seen through the reduction chamber and particularly illustrates the ducts through which the reducing agents are fed to the chamber where reduction takes place, and also illustrates the manner in which the ore is fed into the reducing chamber from a calciner and removed from said chamber.

Fig. 2 is a view in plan illustrating the top of the reduction chamber and the passage-way through which it communicates with the calciner.

Referring to the drawings more particularly, 10 indicates the reducing chamber which is here shown as being rectangular and formed with straight vertical side-walls 11 and 12 and end walls 13 and 14. These walls are closed at their lower end by a bottom 15 upon which is mounted a horizontally disposed conveying screw 16 which passes outwardly through an opening 17 in the wall 12. This conveyer is adapted to remove the nodulated metal and gangue from the reduction chamber after the process of the reduction of the metallic oxids has taken place. These oxids are fed to the chamber through a narrow rectangular opening 18 formed through the closed top of the chamber which establishes communication with a calcining furnace 19 disposed thereabove. A rectangular baffle wall 20 extends downwardly within the reduction chamber from the top thereof and forms a chute through which the oxids are fed.

The metallic oxids, which are delivered to the reducing chamber from the calciner, are treated with carbon monoxid and other gases which have been found to produce satisfactory results as reducing agents in this reducing chamber. These gases are initially supplied to the chamber from a supply pipe 22 which communicates, by an auxiliary pipe 23, to a series of vertically arranged conduits 24 formed within the walls of the reducing chamber and at suitable intervals therearound. These conduits extend from the bottom of the walls to a suitable height and have ducts 25 leading inwardly therefrom to the reducing chamber. The ducts 25 are controlled by cut-off valves 25' which regulate the level at which the reducing gases will be admitted to the chamber. A series of peep-holes are also provided to permit the attendant to observe the filled condition of the chamber.

Disposed through the walls of the reducing chamber, as particularly shown in Fig. 2, are nozzles 21 which communicate with the supply pipe 23'. The nozzles 21 extend upwardly and inwardly from the side-walls of the chamber and terminate at points beneath the opening 18 through the closed top and adjacent the lower edge of the baffle wall therearound. The ends of the nozzles are closed and the lowermost side-walls are formed with a series of perforations 26 varying in diameter. The perforations are graduated from small diameters adjacent the ends of the nozzles, to large diameters adjacent the side walls and permit the reducing gases to be sprayed inwardly and downwardly within the reducing chamber. These gases are supplied at a suitable pressure greater than that of the atmosphere, and, after having performed their chemical action, are drawn off through a draw-off pipe 27.

In operation, the reducing chamber is initially heated by a burner 28 which is detachably mounted through a fire-door 29. When the temperature within the chamber has reached a proper degree of heat, the burner is removed and the metallic oxids are admitted from the calciner. Simultaneously the reducing gases are admitted through the pipe 22 and conduits 24 and the valves 25' are manipulated to direct the gases to the bottom of the reduction chamber. This insures that the first oxids entering the chamber will be acted upon and agitated by the reducing agents. As the volume of oxids is increased within the chamber, the cut-off valves 25' are actuated to insure that only the upper stratum of the ore is acted upon by the gases. When the reducing chamber has been filled until it has reached the nozzles 21, the reducing agents are then supplied through these nozzles and their supply discontinued through the conduits 24 by manipulation of the cut-off valves 30 and 31. While the reducing action is taking place, the reducing chamber will become filled with the metallic oxids which will be delivered from the calciner. The nozzles 21 will be submerged within the ore and will violently agitate it and subject the entire upper portion of the mass to the reducing action of the gases discharged therefrom at which time the metals in the ore will be reduced and become plastic.

After the supply of reducing agent has been discontinued from the ducts 25, the main body of ore will be at rest and only the upper stratum of the ore will be agitated by the action of the reducing agent as it passes outwardly through the openings in the nozzles 21. In this manner the upper stratum of the ore will be continuously and thoroughly mixed and the metals therein will be reduced, becoming plastic and forming nodules which gravitate toward the bottom of the chamber. As the mass of ore below the upper stratum is at rest and not agitated in a manner to offer resistance to the settling action of the metallic nodules, the minute particles of precious metals disseminated throughout the quiescent mass of ore will be collected by the nodules of the basic metals and recovered. The agitation and reduction will further form the metals into nodules which will be composed of the baser metals and as these nodules gravitate they will act as collectors of the microscopic particles of the precious metals, and continued agitation of the mass assisting in the classification of the metal and gangue. Owing to the specific gravity of the various metals, the nodules will become stratified, which will increase their tendency to become many times their original size and will insure that the values adhering thereto will be recovered. As the reduction proceeds, the reduced metal and gangue is drawn off through the spiral conveyer 16 at a rate approximately equal to the inflow from the calciner.

The ore is subjected to an agitation by the passage of the gases therethrough and this agitation causes the ore in the chamber to be raised up to a height in proportion to the pressure of the gases and the specific gravity of the metal contents and the specific gravity of the gangue. Now, as the metal contents or nodules are heavier than the particles of the gangue of equal size, the gas will not raise the metallic nodules as high as the gangue particles and in consequence the metallic nodules will fall faster through the ascending gases than the gangue particles. In this manner the metallic nodules form strata and as the nodules are in a plastic state they adhere to each other in falling and pick up the smaller ones, thus collecting the minute particles of metal and increasing their size and weight. With the continuous discharge at the bottom of the chamber, when the apparatus is in operation, these nodules being so much heavier than the gangue, will travel faster, with a continual downward movement of the gangue. As the agitation takes place in the uppermost strata of the ore in the chamber the continual discharge at the bottom of the chamber causes a downward travel from a point immediately below the zone of agitation and owing to the greater specific gravity of the nodules their travel downward is much faster than the gangue material.

One of the defects in reduction of ores by the reducing gases has been that many of the values are carried through the calciner to the flue and there lost. It will be noted that in the construction here provided, the gas currents will all be directed downwardly into the mass of ore and the baffle wall 20 will act to prevent the gas from passing directly into the calciner as the draw-off pipe 27 is constantly carrying the spent gases from the reducing chamber and will create a draft around the baffle wall instead of through the opening 18.

It will thus be seen that the reducing chamber here described will insure a uniform agitation of the metallic oxids and an intimate contact of the particles thereof with the reducing agents and will permit the nodulated ore to gravitate to the bottom of the chamber and will insure that microscopic particles of the precious metals will be recovered as well as preventing their escape through the calciner in the form of dust.

I claim:

1. In a reduction chamber for the treatment of ores, means for delivering metallic oxids thereto, and means whereby the uppermost stratum of said oxids may be agitated by reducing agents irrespective of the volume of metallic oxids therein.

2. In a reduction apparatus for the treatment of ores, a reduction chamber having an ore delivery opening at the upper end thereof, means for initially heating said chamber, and means whereby the uppermost stratum of the metallic oxids may be agitated by reducing agents irrespective of the volume of oxids within said chamber.

3. In a reduction apparatus for the treatment of ores, means for producing a required degree of heat within said chamber having an inlet opening through the upper end of said chamber through which ore may be delivered thereto, means for progressively agitating the upper stratum of the ore as the chamber is filled, means for discontinuing said progressive agitation and means whereby the upper stratum of said ore may be continuously agitated by reducing agents when the chamber is filled whereby the metal in the ore will be reduced and form nodules which will gravitate to the bottom of the chamber.

4. In a reduction apparatus for the treatment of ores, a reduction chamber having a charging opening at the upper end thereof and a discharge opening and mechanism therefor at the lower end of said chamber, means whereby the uppermost stratum of an ore within the chamber will be continuously agitated by reducing agents as said chamber is filled, and other means whereby the upper stratum of the ore in the filled chamber may be agitated by the reducing agents in a manner to insure the recovery of microscopic particles of metals.

5. In a reduction apparatus for the treatment of ores, having a reduction chamber having an upper inlet opening and a lower outlet opening and having side walls formed with a series of gas inlet openings for supplying reducing agents to said reduction chamber, a series of angularly disposed nozzles positioned above said inlet openings and adapted to discharge reducing agents into the chamber, and other means whereby the uppermost stratum of a metallic oxid with which the chamber is filled may be agitated and thoroughly mixed with said reducing agents irrespective of the volume of metallic substance within said reducing chamber.

6. In a reduction apparatus for the treatment of ores, a reduction chamber having an ore delivery opening at the upper end thereof, means for agitating the upper stratum of the ore in said chamber while the mass of ore below said stratum is at rest, and an outlet opening separate from said delivery opening for carrying off the spent gases.

7. In a reduction apparatus for the treatment of ores, a reduction chamber having an ore delivery opening at the upper end thereof, means for supplying a reducing agent to the upper stratum of ore in said chamber while the mass of ore below said upper stratum is at rest, said means supplying said reducing agent in a manner to thoroughly agitate said upper stratum of ore, and a separate outlet for carrying off the waste gases from said chamber.

In testimony whereof I have signed my name to this specification.

PARISH J. MacDONALD.

Copies of this patent may be obtained for five cents each, by addressing the "Commissioner of Patents, Washington, D. C."